US009678815B2

(12) United States Patent
Tatezono

(10) Patent No.: US 9,678,815 B2
(45) Date of Patent: Jun. 13, 2017

(54) INFORMATION PROCESSING SYSTEM, INFORMATION PROCESSING APPARATUS, AND METHOD OF CONTROLLING THEM

(71) Applicant: CANON KABUSHIKI KAISHA, Tokyo (JP)

(72) Inventor: Masaki Tatezono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 14/224,188

(22) Filed: Mar. 25, 2014

(65) Prior Publication Data

US 2014/0298362 A1    Oct. 2, 2014

(30) Foreign Application Priority Data

Mar. 28, 2013    (JP) .................................. 2013-070460

(51) Int. Cl.
*G06F 9/54* (2006.01)
(52) U.S. Cl.
CPC .................................... *G06F 9/547* (2013.01)
(58) Field of Classification Search
CPC ........................................................ G06F 9/547
USPC .......................................................... 719/330
See application file for complete search history.

(56) References Cited

U.S. PATENT DOCUMENTS

| 6,377,691 | B1 * | 4/2002 | Swift ...................... H04L 63/04 |
| | | | 380/277 |
| 8,752,006 | B1 * | 6/2014 | Tolle .......................... G06F 8/30 |
| | | | 717/106 |
| 9,491,261 | B1 * | 11/2016 | Shagam .................. H04L 67/40 |
| 2008/0320302 | A1 * | 12/2008 | Pilant ...................... H04L 63/10 |
| | | | 713/161 |

FOREIGN PATENT DOCUMENTS

| JP | 06301618 A | 10/1994 |
| JP | 2009-110337 A | 5/2009 |

* cited by examiner

*Primary Examiner* — H S Sough
*Assistant Examiner* — Kimberly Jordan
(74) *Attorney, Agent, or Firm* — Fitzpatrick, Cella, Harper & Scinto

(57) ABSTRACT

There is provided a technique of enabling to easily identify the association between process results in a plurality of components which are executed in association with an RPC. An information processing system in which an application of a first component performs an RPC for a functional function of a second component, the system comprises: a stub of the first component configured to receive the RPC and transmit an RPC message to the second component; and a skeleton of the second component configured to receive the RPC message from the stub and control execution of a predetermined function. The stub generates an RPC message having a header in which a sequence identifier acquired from the first management unit is embedded, and transmits the generated RPC message, and the skeleton extracts a sequence identifier from the header of the received RPC message.

10 Claims, 5 Drawing Sheets

LOG FILE (601)

| SEQUENCE IDENTIFIER (602) | DATE AND TIME (603) | CONTENT (604) |
|---|---|---|
| "JOB001" | 12/04 17:20 | Start Application |
| "JOB002" | 12/04 17:21 | Abort Application |
| "JOB001" | 12/04 17:23 | End Application |

LOG FILE (701)

| SEQUENCE IDENTIFIER (702) | DATE AND TIME (703) | CONTENT (704) |
|---|---|---|
| "JOB009" | 12/04 17:20 | Exec Function |
| "JOB001" | 12/04 17:22 | Exec Function |
| "JOB009" | 12/04 17:23 | Exec Function |

0x00000049 (801) — 0x00000053 (802) — 0x00000054 (803)

INFORMATION PROCESSING SYSTEM, INFORMATION PROCESSING APPARATUS, AND METHOD OF CONTROLLING THEM

BACKGROUND OF THE INVENTION

Field of the Invention

The present invention relates to an information processing technique using an RPC (Remote Procedure Call).

Description of the Related Art

There is available an RPC (Remote Procedure Call) as a technique for allowing an application to use a function provided by an external functional component. In a remote procedure call scheme, a component (to be referred to as a calling component hereinafter) on the calling side defines a function interface for the use of a function provided by a functional component. When an application calls the function interface, a remote procedure call message is transmitted to a functional component to execute the function. In some cases, a functional component transmits a return message to a calling component.

In addition, when performing a remote procedure call, a calling component determines a destination and performs control to properly transmit and receive messages. This makes it possible to perform calling independently of the relationship between the calling component and a functional component on a process. That is, it is possible to perform calling regardless of whether these components are on the same process or different processes or are assigned to different CPUs. This makes it easy for an application developer to develop applications because of the unnecessity of a description concerning the transmission/reception of messages between components.

The remote procedure call scheme sometimes calls, from a process in a functional component which has called a calling component, another functional component. In such a case, in application development, it is necessary to associate a process in each component corresponding to one process sequence and a process result.

Japanese Patent Laid-Open No. 2009-110337 (patent literature 1) discloses a technique of performing divisional processing for one process unit by using a plurality of computers. More specifically, this patent literature discloses a method of performing divisional processing, assigning request numbers identifying the respective divided processes as processes belonging to the same process sequence and using them for log output. The patent literature also discloses a method of, when transmitting a request number across physical apparatuses, transmitting the request number while being added as the argument of a remote procedure call. These processes enable to confront process results based on a given request.

According to the conventional technique disclosed in patent literature 1 or the like, however, when a component at a calling destination further calls another component, an identifier is not taken over. More specifically, the component at the calling destination only calls another component by using its own identifier. That is, when executing a process sequence by using a remote procedure call across a plurality of components, no identifier is propagated. For this reason, it is difficult to identify the association between the process results obtained by the respective components.

SUMMARY OF THE INVENTION

According to an aspect of the present invention, an information processing system in which an application of a first component performs an RPC (Remote Procedure Call) for a functional function of a second component, the system comprises: a stub of the first component configured to receive the RPC and transmit an RPC message to the second component; and a skeleton of the second component configured to receive the RPC message from the stub and control execution of a predetermined function, wherein the stub comprises a first management unit formed as a thread local storage of the stub and configured to store a sequence identifier, a generation unit configured to generate, with respect to the RPC, an RPC message having a header in which a sequence identifier acquired from the first management unit is embedded, and a transmission unit configured to transmit the generated RPC message, and the skeleton comprises a reception unit configured to receive an RPC message, an extraction unit configured to extract a sequence identifier from the header of the received RPC message, and a second management unit formed as a thread local storage of the skeleton and configured to store the extracted sequence identifier.

According to another aspect of the present invention, an information processing apparatus which functions as a stub of a first component in an information processing system in which an application of the first component performs an RPC to a functional function of a second component, the apparatus comprises: a first management unit formed as a thread local storage of the stub and configured to store a sequence identifier; a generation unit configured to generate, with respect to the RPC, an RPC message having a header in which a sequence identifier acquired from the first management unit is embedded; and a transmission unit configured to transmit the generated RPC message.

According to still another aspect of the present invention, an information processing apparatus which functions as a skeleton of a second component in an information processing system in which an application of the first component performs an RPC for a functional function of a second component, the apparatus comprises: a reception unit configured to receive an RPC message from the first component; an extraction unit configured to extract a sequence identifier from a header of the received RPC message; and a second management unit formed as a thread local storage of the skeleton and configured to store the extracted sequence identifier.

According to the present invention, it is possible to easily identify the association between the results of processes derived from a remote procedure call of interest and executed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings. Note that the following embodiments are merely examples and do not limit the scope of the present invention.

First Embodiment

An information processing apparatus 101 will be exemplarily described as the first embodiment of an information processing system according to the present invention. The first embodiment will exemplify a remote procedure call (a so-called synchronous call) in a case in which when a calling component outputs a function execution request to a functional component, a response is returned.

<Apparatus Arrangement>

Figure 1:
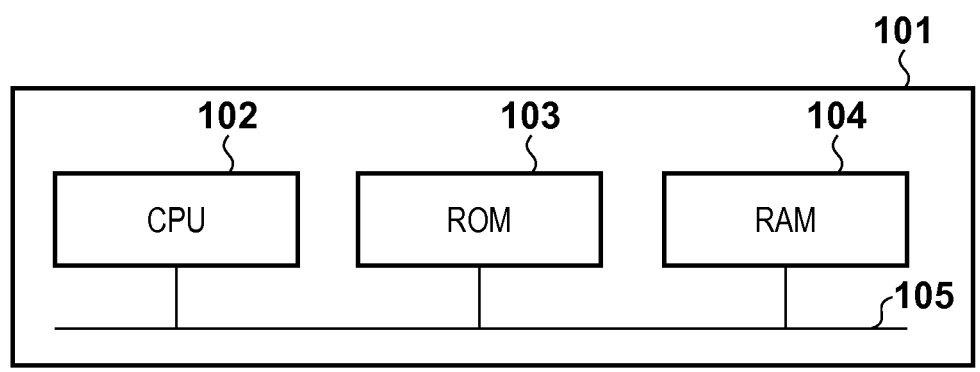
FIG. 1 is a block diagram showing the arrangement of an information processing apparatus according to the first embodiment.

FIG. 1 is a block diagram showing the schematic arrangement of an information processing apparatus according to the first embodiment. In this case, the information processing apparatus is shown as a single computer apparatus but may be constituted by a plurality of computer apparatuses. In this case, the plurality of computer apparatuses are connected to each other via a local area network (LAN) or bus so as to be communicative to each other.

The information processing apparatus 101 includes a CPU (central Processing Unit) 102 which controls the overall apparatus, a ROM (Read Only Memory) 103, and a RAM (Random Access Memory) 104. The ROM 103 stores programs and parameters which require no change. In contrast, the RAM 104 temporarily stores programs and data and is used as a work memory. A bus 105 is a system bus which communicatively connects these components.

Note that the information processing apparatus 101 receives an operation from the user and may include an input interface (not shown) such as a pointing device and a keyboard, which input data. The information processing apparatus 101 may also include a display unit (not shown) for displaying and outputting held data or supplied data and a network interface (not shown) for connection to a network circuit. In addition, the information processing apparatus 101 may include an external storage device (not shown) such as a hard disk or memory card. The information processing apparatus 101 may also include a reading apparatus (not shown) such as a magnetic disk, optical disk, or semiconductor memory which reads a detachable medium.

The CPU 102 loads, in the RAM 104, various types of programs stored in the ROM 103, along with the activation of the information processing apparatus 101, and executes various types of loaded programs, thereby implementing various types of functions (described later).

Figure 2:
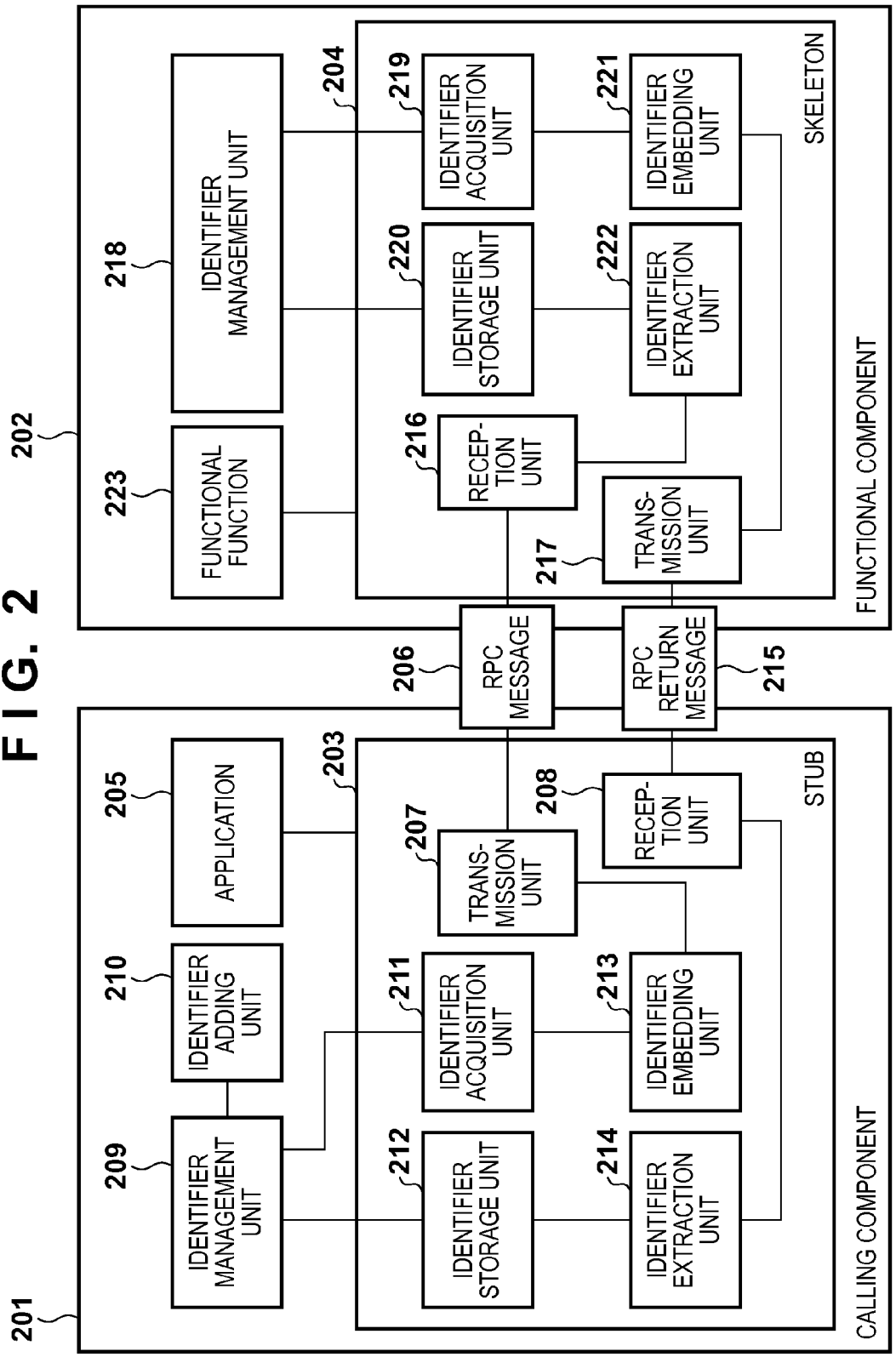
FIG. 2 is a functional block diagram.

FIG. 2 is a functional block diagram of the information processing apparatus according to the first embodiment. The CPU 102 implements the following units by executing various types of programs stored in the ROM 103.

Components 201 and 202 are components each of which performs a predetermined process. Assume that in the following description, the component 201 calls the function of the component 202 by using a remote procedure call. The components 201 and 202 will be respectively referred to as a calling component and a functional component hereinafter. That is, in this case, the functional component 202 provides a function by executing a predetermined process in accordance with a call from the calling component 201.

In this case, a unit of execution by the calling component 201 and the functional component 202 is a program unit (to be referred to as a process hereinafter) which executes a predetermined process upon reception of the allocation of a memory area from an OS (Operating System). Assume that the information processing apparatus 101 causes a plurality of processes to operate.

The calling component 201 (first component) incorporates a stub 203, an application 205, an identifier management unit 209, and an identifier adding unit 210.

The stub 203 is a stub used for a remote procedure call. More specifically, when calling the functional component 202 by a remote procedure call, the application 205 calls the call function (not shown) held by the stub. At this time, the stub 203 transmits an RPC message 206 requesting function execution to a skeleton 204 in the functional component 202 at the calling destination.

The identifier management unit 209 (first management unit and first storage unit) is a functional unit which manages sequence identifiers (to be described later), and holds the sequence identifiers. The identifier adding unit 210 is a functional unit which generates a sequence identifier.

In addition, the stub 203 includes a transmission unit 207, a reception unit 208, an identifier acquisition unit 211, an identifier storage unit 212, an identifier embedding unit 213, and an identifier extraction unit 214.

The transmission unit 207 is a functional unit which transmits a remote procedure call message to the skeleton 204. The reception unit 208 is a functional unit which receives a remote procedure call from the skeleton 204.

The identifier acquisition unit 211 is a functional unit which acquires a sequence identifier from the identifier management unit 209. The identifier storage unit 212 is a functional unit which controls the identifier management unit 209 to store a sequence identifier.

The identifier embedding unit 213 is a functional unit which embeds a sequence identifier in the RPC message 206 (to be described later). The identifier extraction unit 214 is a functional unit (return identifier extraction unit) which extracts a sequence identifier from an RPC return message 215 received from the skeleton 204.

The functional component 202 (second component) incorporates the skeleton 204, an identifier management unit 218, and a functional function 223.

The skeleton 204 is a functional unit which receives a remote procedure call message from the stub 203 and calls (controls execution) the functional function 223 corresponding to the function designated by the message.

The identifier management unit 218 (second management unit and second storage unit) is a functional unit which manages a sequence identifier in a functional component. The functional function 223 provides a predetermined function via the skeleton 204.

The skeleton 204 further includes a reception unit 216, a transmission unit 217, an identifier acquisition unit 219, an identifier storage unit 220, an identifier embedding unit 221, and an identifier extraction unit 222.

The reception unit 216 is a functional unit which receives the remote procedure call message 206 transmitted from the stub 203. The transmission unit 217 is a functional unit (return message transmission unit) which transmits the RPC return message 215 to the stub 203.

The identifier acquisition unit 219 is a functional unit which acquires a sequence identifier from the identifier management unit 218. The identifier storage unit 220 is a functional unit which controls the identifier management unit 218 to store a sequence identifier.

The identifier embedding unit 221 is a functional unit which embeds a sequence identifier in the RPC return message 215 (to be described later). The identifier extraction unit 222 is a functional unit which extracts a sequence identifier from the RPC message 206 received from the stub 203.

Assume that in this case, the identifier management unit 209 and the identifier management unit 218 are implemented as thread local storages (data areas individually held by threads) provided by the OS. Note that the calling component 201 and the functional component 202 may be arranged on a single computer apparatus or different computer apparatuses.

In addition, assume that the RPC message 206 is arranged in a memory area (heap area) allocated by the OS to a process on the calling component 201. Likewise, assume that the RPC return message 215 is arranged in a memory area (heap area) allocated by the OS to a process on the functional component 202.

Note that if the calling component 201 and the functional component 202 are implemented by a single computer apparatus, the RPC message 206 and the RPC return message 215 are arranged in a shared memory area provided by the OS.

<Operation of Apparatus>

Figure 3:
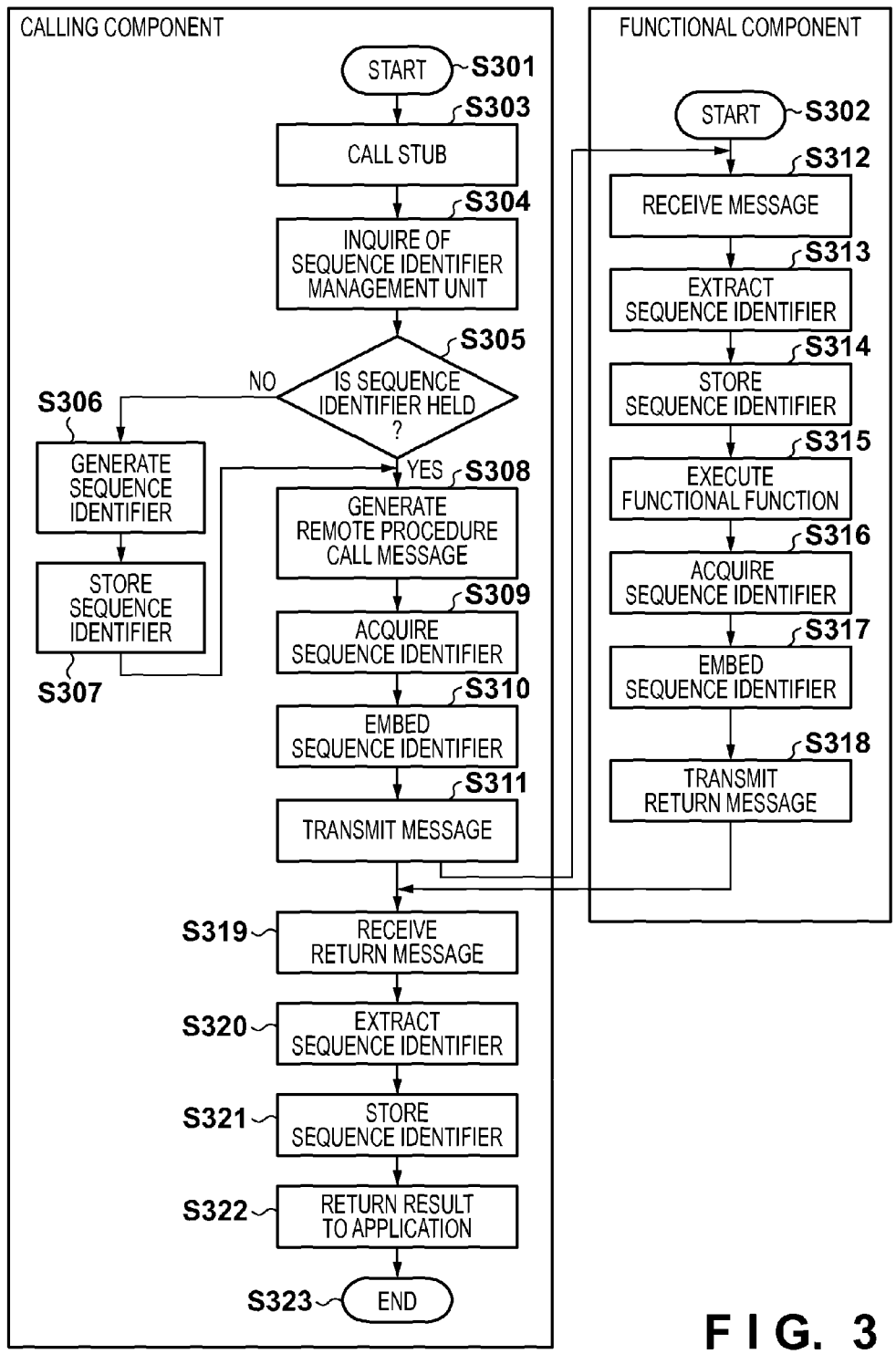
FIG. 3 is a flowchart showing a processing procedure.

FIG. 3 is a flowchart for explaining a call processing procedure according to the first embodiment. For the sake of simplicity, assume that the CPU 102 of the single information processing apparatus 101 executes both the calling component 201 and the functional component 202. Note, however, as described above, that two different information processing apparatuses configured to be communicative to each other may respectively execute the calling component 201 and the functional component 202.

In step S301, the CPU 102 starts a process in the calling component 201. Assume that in this case, the thread held by the application 205 executes a process in the calling component 201. In step S302, the CPU 102 starts a process in the functional component 202. Assume that in this case, the thread held by the skeleton 204 executes a process in the functional component 202.

In step S303, the application 205 calls the stub 203 via a call function to start a remote procedure call.

In step S304, the stub 203 inquires of the identifier management unit 209 the held state of a sequence identifier. In step S305, the stub 203 then determines whether the identifier management unit 209 holds a sequence identifier. If the identifier management unit 209 holds a sequence identifier, the process advances to step S308. If the identifier management unit 209 does not hold a sequence identifier, the process advances to step S309. For example, the stub 203 reads the identifier management unit 209 (that is, the thread local storage). If the stub 203 reads "NULL", the stub 203 determines that the identifier management unit 209 does not hold a sequence identifier. Otherwise, the stub 203 determines that the identifier management unit 209 holds a sequence identifier.

In step S306, the identifier management unit 209 requests the identifier adding unit 210 to issue a sequence identifier. The identifier adding unit 210 (identifier generation unit) generates a 32-bit random number based on the current time acquired from a timer (not shown) and returns the random number as a sequence identifier. Note that as a method of generating a sequence identifier, it is conceivable to also use a method of generating identifiers by using a character string, the identifier of a calling source application, a date and time, and the like. Note that a sequence identifier can be anything that enables the sequence to be uniquely identified or may be designated by the user.

In step S307, the identifier adding unit 210 writes the generated sequence identifier in the identifier management unit 209 (thread local storage). Note that the calling component may be configured to request the identifier storage unit 212 to control the storage of the generated sequence identifier.

In step S308, the stub 203 secures, in the heap area, the RPC message 206 to be transmitted to the skeleton 204. The stub 203 then writes destination information 402 indicating the functional component 202 and calling source information 403 indicating the calling component 201 itself in response to the RPC message 206 secured in the heap area. In addition, the stub 203 writes argument information 405 as the argument of a call function and call function information 404 indicating the function of a calling target.

Figure 4:
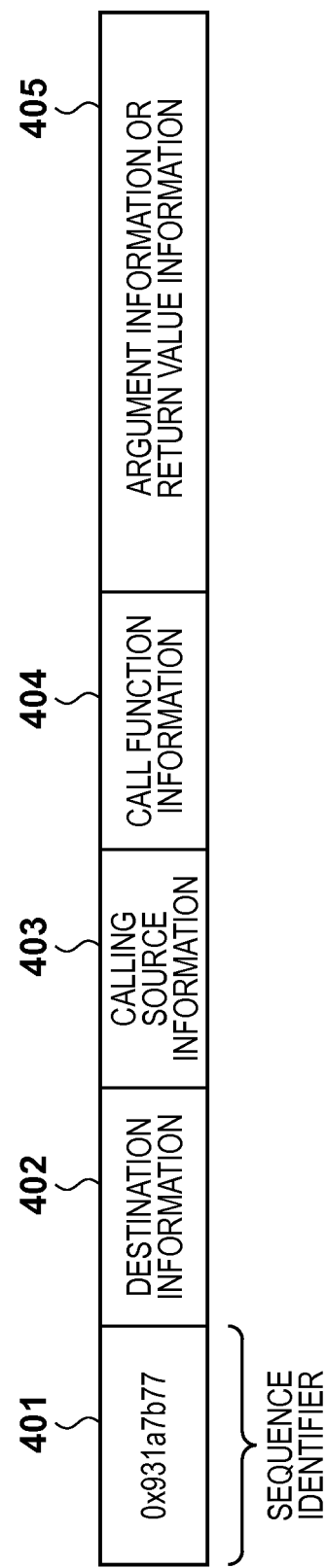
FIG. 4 is a view showing an example of a remote procedure call message.

FIG. 4 is a view showing an example of a remote procedure call message. Note that when the functional component 202 is arranged on a computer apparatus different from that on which the calling component 201 is arranged, the apparatus executes endian conversion of the argument information 405 and the like in accordance with the platform of the functional component 202. Note that the format of the RPC return message 215 (to be described later) is the same as that of the RPC message 206.

In step S309, the identifier acquisition unit 211 acquires a sequence identifier from the identifier management unit 209. In step S310, the identifier embedding unit 213 embeds the acquired sequence identifier in the RPC message 206. In this case, the identifier embedding unit 213 embeds a header portion 401 in the RPC message 206.

In step S311, the transmission unit 207 transmits the generated RPC message 206 to the functional component 202 as a destination. After the transmission, the generated remote procedure call message is deleted from the heap area. Note that the transmission unit 207 selects a communication path in accordance with the destination information 402. After the transmission, the calling component 201 enters a reception waiting state to wait for a return from the functional component 202.

In step S312, the reception unit 216 writes the RPC message 206 from the calling component 201 and writes it in the heap area. In step S313, the identifier extraction unit 222 extracts a sequence identifier from the RPC message 206 written in the heap area.

In step S314, the identifier storage unit 220 stores the extracted sequence identifier in the identifier management unit 218. At this time, the identifier storage unit 220 stores the sequence identifier in association with the RPC message 206. For example, like the identifier management unit 209 of the calling component 201, the identifier storage unit 220 sets the sequence identifier in the thread local storage.

In step S315, the skeleton 204 calls the functional function 223 based on the call function information 404 and argument information 405 embedded in the RPC message 206. When the functional function 223 returns a return value, the skeleton 204 receives the return value and writes (return message generation unit) it in the RPC return message 215 to be returned to the stub 203. Note that the RPC return message 215 may be generated by overwriting it on the RPC message 206 in the heap area which is written in step S312. Alternatively, the functional component may newly secure a heap area and write the newly generated RPC return message 215 in the area. For example, if data input and output to and from the functional function 223 have different structures, it is necessary to secure a new area.

Assume that in this case, the functional component newly secures a heap area for the RPC return message 215. Upon reading and temporarily storing the calling source information 403 from the RPC message 206 received from the calling component 201, the functional component frees the heap area of the RPC message 206 received and stored in step S312. Thereafter, the functional component newly secures the RPC return message 215 in the heap area in accordance with the format of a return value, and writes the temporarily stored calling source information 403 in the destination information 402.

In step S316, the identifier acquisition unit 219 acquires a sequence identifier corresponding to the RPC return message 215 from the identifier management unit 218. In step S317, the identifier embedding unit 221 then embeds the sequence identifier in the RPC return message 215.

In step S318, the transmission unit 217 transmits the RPC return message 215 to the stub 203. Thereafter, the functional component 202 enters a message reception waiting state (S302) again.

In step S319, the reception unit 208 receives the RPC return message 215 from the functional component 202 and writes the message in the heap area. In step S320, the identifier extraction unit 214 extracts a sequence identifier from the RPC return message 215 written in the heap area in step S319. In step S321, the identifier storage unit 212 further stores the extracted sequence identifier in the identifier management unit 209.

In step S322, the stub 203 returns a call function to the application 205 which has performed a remote procedure call. In this case, if the functional function 223 has a return value, the stub 203 reads the return value from the RPC return message 215 and transfers the message to the application 205.

Note that upon returning a call function result to the application 205, the identifier management unit 209 may delete the associated sequence identifier. If the sequence identifier is not deleted, the application 205 can acquire a sequence identifier via the identifier acquisition unit 211.

For example, if the calling component holds no sequence identifier in step S305 and generates and stores a sequence identifier in steps S306 and S307, the calling component may delete the sequence identifier. Otherwise, the calling component may keep holding the sequence identifier. If the functional function 223 having a different combination of information calls the call function of the stub 203, a sequence identifier is stored in the identifier management unit 209 (thread local storage). In this case, determining "Yes" in step S305 and inheriting the already stored sequence identifier enables to refer to all processes associated with the sequence identifier even if multiple remote procedure calls are performed.

As described above, the first embodiment is configured to perform control to store a sequence identifier in a thread local storage during a function process and to store the sequence identifier in a message header at the time of message communication. This makes it possible to inherit a sequence identifier at the time of, for example, function calling in the stub, message transmission/reception, function calling in the skeleton, and a remote procedure call from a process called by a remote procedure call. It is therefore possible to use the sequence identifier as information that helps to, for example, confront process results of a plurality of processes across a plurality of components or visualize a process using an analytical tool.

(First Modification)

A case in which a calling component does not wait for a response from a functional component (a so-called asynchronous call) will be described below.

The case of an asynchronous call differs from the above case in the following points in the processing procedure described with reference to FIG. 3. First of all, in step S308, the calling component does not write the calling source information 403 because the skeleton 204 does not make a reply to the remote procedure call message transmitted to the skeleton 204. After the transmission of a message in step S311, the process then jumps to step S322 to return a response to the application 205. At this time, the calling component may determine, in the same manner as in step S322 in the first embodiment, whether to delete the sequence identifier from the identifier management unit 209 (thread local storage). In addition, upon executing the functional function 223 in step S315, the calling component writes an empty sequence identifier by using the identifier storage unit 220. This deletes the sequence identifier from the identifier management unit 218. Subsequently, the functional component 202 enters a message reception waiting state.

(Second Modification)

The second modification will exemplify a case in which after an application adds a sequence identifier, a calling component performs a remote procedure call to request a functional component to execute a function. In addition, the calling component outputs execution results in the application and the functional function. Only differences from the above processing described with reference to FIG. 3 will be described below.

In step S303, the application 205 sets a sequence identifier and stores it in the identifier management unit 209 before calling the call function of the stub 203.

Figure 5:
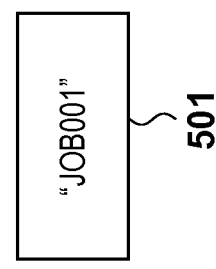
FIG. 5 is a view showing an example of a sequence identifier.

FIG. 5 is a view showing an example of a sequence identifier. A sequence identifier 501 exemplarily indicates the sequence identifier stored in the identifier storage unit 212. Assume that in this case, the character string "JOB001" is set as a value.

Figures 6, 7, 8:
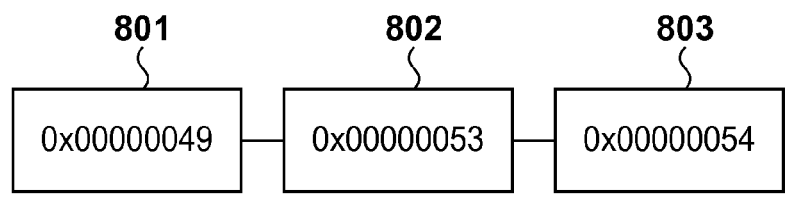
FIG. 6 is a view showing an example of an execution result output.
FIG. 7 is a view showing another example of an execution result output.
FIG. 8 is a view showing an example of a list of sequence identifiers.

In addition, in step S303, the stub 203 outputs an execution result (a stub calling result obtained by the application) to a file 601 as a log (first output unit). FIG. 6 is a view showing an example of an execution result output. For example, a sequence identifier 602 is "JOB001", a date and time 603 is "12/04 17:20", and a content 604 is "Start Application". This indicates that the calling component 201 starts "Application" at the time "12/04 17:20" in association with the sequence identifier "JOB001".

On the other hand, in step S315, the skeleton 204 outputs an execution result to a file 701 as a log (second output unit) during execution of the functional function in the functional component 202. FIG. 7 is a view showing an example of the execution result output output from the functional component. The value of a sequence identifier 702 written out is "JOB001", the value of a date and time 703 is "12/04 17:22", and the value of a content 704 is "Exec Function". This indicates that that the functional component 202 has executed "Function" at the time "12/04 17:22" in association with the sequence identifier "JOB001".

In step S322, in the stub 203, the application 205 outputs an execution result to the file 601 as a log upon receiving a response. The value of the sequence identifier 602 written out is "JOB001", the value of the date and time 603 is "12/04 17:23", and the value of the content 604 is "End Application". This indicates that the calling component 201 terminates "Application" at the time "12/04 17:23" in association with the sequence identifier "JOB001".

Upon completion of a series of processing, it is possible to generate a list of the results of a plurality of processes executed by the respective components from the file 601 generated by the stub 203 and the file 701 generated by the skeleton 204. For example, extracting and merging results corresponding to the sequence identifier value "JOB001" can generate a list of a plurality of process results concerning the remote procedure call associated with "JOB001".

(Third Modification)

The third modification will exemplify the form in which the identifier management unit holds a plurality of sequence identifiers. Only differences from the first embodiment described above will be described below.

The identifier management unit 209 is configured to hold a plurality of sequence identifiers by using a list structure. FIG. 8 is a view exemplarily showing a list structure including three sequence identifiers. After step S303, the process therefore skips steps S304 and S305 and executes steps S306 and S307 in the order named. In step S307, when storing a generated sequence identifier, the calling component adds the sequence identifier to the end of a list of sequence identifiers held by the identifier management unit 209. The identifier management unit 209 manages the list structure. For example, a newly added sequence identifier 803 is added after existing sequence identifiers 801 and 802.

In step S310, the identifier embedding unit 213 embeds the overall list of sequence identifiers in the RPC message 206. In addition, in steps S313, S314, S316, and S317 executed by the functional component 202, the component performs extraction, storage, acquisition, and embedding with respect to the overall list of sequence identifiers. In step S322, however, the stub 203 deletes the sequence identifier 803 at the end of the list when making a replay to the application 205. This makes it possible to properly delete the sequence identifier associated with (derived from) a remote procedure call by the application 205 at the end of the remote procedure call as a trigger.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-070460, filed Mar. 28, 2013 which is hereby incorporated by reference herein in its entirety.

What is claimed is:

1. An information processing system in which an application of a first component performs an RPC (Remote Procedure Call) for a functional function of a second component, the system comprising:
at least one CPU coupled to a memory device and programmed to provide:
a stub of the first component configured to receive the RPC and transmit an RPC message to the second component; and
a skeleton of the second component configured to receive the RPC message from said stub and control execution of a predetermined function, wherein
said stub comprises
a first management unit formed as a thread local storage of said stub and configured to store a sequence identifier, which can be inherited over multiple RPCs,
a generation unit configured to generate, with respect to the RPC, an RPC message having a header in which a sequence identifier acquired from said first management unit is embedded, and
a transmission unit configured to transmit the generated RPC message, and
said skeleton comprises
a reception unit configured to receive an RPC message,
an extraction unit configured to extract a sequence identifier from the header of the received RPC message,
a second management unit formed as a thread local storage of said skeleton and configured to store the extracted sequence identifier,
an execution control unit configured to acquire an execution result obtained by executing the functional function based on the received RPC message, the functional function being a component different from said skeleton, and
a return message generation unit configured to generate an RPC return message having a header in which the extracted sequence identifier is embedded and storing the execution result.

2. The system according to claim 1, wherein said skeleton further comprises
a return message transmission unit configured to transmit the generated RPC return message,
said stub further comprises
a reception unit configured to receive an RPC return message, and
a return identifier extraction unit configured to extract a sequence identifier from the received RPC return message, and
said stub stores the extracted sequence identifier in said first management unit.

3. The system according to claim 1, wherein said stub further comprises a first output unit configured to output an execution result of the RPC and a sequence identifier stored in said first management unit as a log in association with each other, and said skeleton further comprises a second output unit configured to output an execution result of the functional function and a sequence identifier stored in said second management unit as a log in association with each other.

4. The system according to claim 1, wherein said stub further comprises a reception unit configured to receive designation of a sequence identifier stored in said first management unit from a user.

5. The system according to claim 1, wherein said stub further comprises an identifier generation unit configured to generate a sequence identifier based on the RPC and store the sequence identifier in said first management unit.

6. The system according to claim 1, wherein said first management unit further comprises a deletion unit configured to delete a sequence identifier stored in said first management unit after transmission of an RPC message by said transmission unit when the RPC is an asynchronous call.

7. The system according to claim 1, wherein said first management unit stores a plurality of associated sequence identifiers as one list structure, said stub sets one list structure acquired from said first management unit with respect to the RPC, and said generation unit generates an RPC message having a header in which the set list structure is embedded.

8. An information processing apparatus which functions as a skeleton of a second component in an information processing system in which an application of the first component performs an RPC (Remote Procedure Call) for a functional function of a second component, the apparatus comprising:
   at least one CPU coupled to a memory device and programmed to provide:
      a reception unit configured to receive an RPC message from the first component;
      an extraction unit configured to extract a sequence identifier, which can be inherited over multiple RPCs, from a header of the received RPC message;
      a second management unit formed as a thread local storage of the skeleton and configured to store the extracted sequence identifier,
      an execution control unit configured to acquire an execution result obtained by executing the functional function based on the received RPC message, the functional function being a component different from said skeleton, and
      a return message generation unit configured to generate an RPC return message having a header in which the extracted sequence identifier is embedded and storing the execution result.

9. A method of controlling an information processing system in which an application of a first component performs an RPC (Remote Procedure Call) for a functional function of a second component, the information processing system including a stub of the first component which receives the RPC and transmits an RPC message to the second component, and a skeleton of the second component which receives the RPC message from the stub and controls execution of a predetermined function, the method comprising:
   storing a sequence identifier, which can be inherited over multiple RPCs, in a first storage unit formed as a thread local storage of the stub;
   causing the stub to generate, with respect to the RPC, an RPC message having a header in which a sequence identifier acquired from the first storage unit is embedded;
   causing the stub to transmit the generated RPC message;
   causing the skeleton to receive the RPC message;
   causing the skeleton to extract a sequence identifier from the header of the received RPC message;
   causing the skeleton to store the extracted sequence identifier in a second storage unit formed as a thread local storage of the skeleton;
   causing the skeleton to acquire an execution result obtained by executing the functional function based on the received RPC message, the functional function being a component different from the skeleton, and
   causing the skeleton to generate an RPC return message having a header in which the extracted sequence identifier is embedded and storing the execution result.

10. A method of controlling an information processing apparatus which functions as a skeleton of a second component in an information processing system in which an application of the first component performs an RPC (Remote Procedure Call) for a functional function of a second component, the method comprising:
   receiving an RPC message from the first component;
   extracting a sequence identifier, which can be inherited over multiple RPCs, from a header of the received RPC message;
   storing the extracted sequence identifier in a storage unit formed as a thread local storage of the skeleton,
   acquiring an execution result obtained by executing the functional function based on the received RPC message, the functional function being a component different from the skeleton; and
   generating an RPC return message having a header in which the extracted sequence identifier is embedded and storing the execution result.

* * * * *